United States Patent
Oger et al.

(10) Patent No.: US 9,528,408 B2
(45) Date of Patent: *Dec. 27, 2016

(54) EXHAUST SYSTEM COMPRISING EXOTHERM-GENERATING CATALYST

(71) Applicant: Johnson Matthey Public Limited Company, London (GB)

(72) Inventors: Bernard Paul Gabriel Ghislain Marie Oger, Nameche (BE); Paul Richard Phillips, Royston (GB); Martyn Vincent Twigg, Cambridge (GB); Andrew Peter Walker, Hazlemere (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/569,968

(22) Filed: Dec. 15, 2014

(65) Prior Publication Data
US 2015/0098879 A1    Apr. 9, 2015

Related U.S. Application Data

(63) Continuation of application No. 13/527,101, filed on Jun. 19, 2012, now Pat. No. 8,925,304, which is a
(Continued)

(30) Foreign Application Priority Data

Nov. 23, 2004   (GB) .................................. 0425708.5

(51) Int. Cl.
*F01N 3/00*      (2006.01)
*F01N 3/025*     (2006.01)
(Continued)

(52) U.S. Cl.
CPC ............. *F01N 3/0253* (2013.01); *B01D 53/94* (2013.01); *B01D 53/944* (2013.01);
(Continued)

(58) Field of Classification Search
USPC .. 60/274, 286, 297, 299, 301, 303; 422/168, 422/177, 180
See application file for complete search history.

(56) References Cited

U.S. PATENT DOCUMENTS

| 3,741,725 A | 6/1973 | Graham |
| 4,303,552 A | 12/1981 | Ernest et al. |

(Continued)

FOREIGN PATENT DOCUMENTS

| EP | 0 341 832 A2 | 11/1989 |
| EP | 0 622 107 A2 | 11/1994 |

(Continued)

OTHER PUBLICATIONS

Heck et al., *Catalytic Air Pollution Control—Commercial Technology*, Second Edition, John Wiley & Sons, Inc., New York, 2002, pp. 79-80.
(Continued)

*Primary Examiner* — Binh Q Tran
(74) *Attorney, Agent, or Firm* — Gary D. Mangels

(57) ABSTRACT

An apparatus comprising a compression ignition engine and an exhaust system therefor comprising at least one exhaust system component for treating exhaust gas and means for generating an exotherm for heating the at least one exhaust system component, which exotherm generating means consisting essentially of a catalyst and means for injecting hydrocarbon into exhaust gas for combustion on the catalyst, which catalyst consisting essentially of both a palladium (Pd) component and a platinum (Pt) component, and an optional support material, disposed on a substrate monolith.

17 Claims, 3 Drawing Sheets

Related U.S. Application Data continuation of application No. 11/719,912, filed as application No. PCT/GB2005/050210 on Nov. 22, 2005, now Pat. No. 8,220,251.

(51) Int. Cl.

| | | |
|---|---|---|
| *B01D 53/94* | (2006.01) | |
| *F01N 3/023* | (2006.01) | |
| *F01N 3/035* | (2006.01) | |
| *F01N 3/08* | (2006.01) | |
| *F01N 3/20* | (2006.01) | |
| *F01N 13/00* | (2010.01) | |

(52) U.S. Cl.
CPC ....... *B01D 53/945* (2013.01); *B01D 53/9454* (2013.01); *F01N 3/0231* (2013.01); *F01N 3/035* (2013.01); *F01N 3/0814* (2013.01); *F01N 3/0821* (2013.01); *F01N 3/206* (2013.01); *F01N 13/009* (2014.06); *F01N 13/0093* (2014.06); *B01D 2252/10* (2013.01); *B01D 2255/102* (2013.01); *B01D 2255/2092* (2013.01); *F01N 2510/06* (2013.01); *Y02T 10/22* (2013.01)

(56) References Cited

U.S. PATENT DOCUMENTS

| | | | |
|---|---|---|---|
| 4,485,621 A | 12/1984 | Wong et al. | |
| 4,686,827 A | 8/1987 | Wade et al. | |
| 5,014,511 A | 5/1991 | Wade et al. | |
| 5,157,007 A | 10/1992 | Domesle et al. | |
| 5,665,322 A | 9/1997 | Kiyohide et al. | |
| 6,087,298 A | 7/2000 | Sung et al. | |
| 6,172,000 B1 | 1/2001 | Chattha et al. | 502/324 |
| 6,634,169 B1* | 10/2003 | Andersen | B01D 53/9454 60/274 |
| 6,753,294 B1 | 6/2004 | Brisley et al. | |
| 7,165,393 B2 | 1/2007 | Betta et al. | 60/286 |
| 7,189,376 B2* | 3/2007 | Kumar | B01J 23/44 422/171 |
| 7,264,785 B2 | 9/2007 | Blakeman et al. | |
| 7,374,729 B2* | 5/2008 | Chen | B01D 53/945 422/177 |
| 7,485,270 B2 | 2/2009 | Twigg et al. | |
| 7,576,031 B2 | 8/2009 | Beutel et al. | |
| 7,678,734 B2 | 3/2010 | Chigapov et al. | 502/304 |
| 7,875,573 B2 | 1/2011 | Beutel et al. | 502/339 |
| 7,977,275 B2 | 7/2011 | Pfeifer et al. | |
| 8,006,485 B2* | 8/2011 | Twigg | B01D 53/945 60/274 |
| 8,220,251 B2* | 7/2012 | Oger | B01D 53/945 422/168 |
| 8,263,033 B2 | 9/2012 | Dobson et al. | 423/213.5 |
| 8,765,625 B2* | 7/2014 | Hao | B01D 53/944 502/245 |
| 8,858,904 B2* | 10/2014 | Punke | B01D 53/9468 422/177 |
| 8,925,304 B2* | 1/2015 | Oger | B01D 53/945 422/168 |
| 2002/0053202 A1 | 5/2002 | Akama et al. | |

FOREIGN PATENT DOCUMENTS

| | | |
|---|---|---|
| EP | 1 580 411 A1 | 9/2005 |
| GB | 2 064 983 A | 6/1981 |
| GB | 2 406 803 A | 4/2005 |
| JP | 59-041706 A | 3/1984 |
| JP | 61-033233 A | 2/1986 |
| JP | 61-234932 A | 10/1986 |
| JP | 62-68544 A | 3/1987 |
| JP | 6-198181 A | 7/1994 |
| JP | 6-229236 A | 8/1994 |
| JP | 2002-45702 A | 2/2002 |
| JP | 2004-100659 A | 4/2004 |
| WO | WO-00/28196 A1 | 5/2000 |
| WO | WO-00/34632 A1 | 6/2000 |
| WO | WO-2004/025093 A1 | 3/2004 |
| WO | WO-2004/025096 A1 | 3/2004 |

OTHER PUBLICATIONS

Heck et al., *Catalytic Air Pollution Control—Commercial Technology*, Second Edition, Chapter 2, John Wiley & Sons, Inc., New York, 2002, pp. 11-24.

Sakai et al., "Unburned Fuel and Formaldehyde Purification Characteristics of Catalytic Converters for Natural Gas Fueled Automotive Engine," SAE Technical Paper No. 920596, presented at the International Congress & Exposition, Detroit, Michigan, Feb. 24-28, 1992, pp. 129-135.

Opposition Brief, filed Jan. 15, 2010, Opposition by BASF Catalysts LLC to EP Patent No. 1 815 112.

Patentee's reply to Communication of notices of opposition (R.79(1) EPC) dated Feb. 19, 2010, filed Aug. 27, 2010, Opposition by BASF Catalysts LLC to EP Patent No. 1 815 112.

Opponent's reply to Communication pursuant to Rule 79(3) EPC, of observations and amendments filed by the proprietor of the patent dated Sep. 6, 2010, filed Dec. 16, 2010, Opposition of BASF Catalysts LLC to EP Patent No. 1 815 112.

Translation of Official Action dated Oct. 8, 2010, received in Japanese Patent Application No. 2007-542130.

* cited by examiner

EXHAUST SYSTEM COMPRISING EXOTHERM-GENERATING CATALYST

CROSS-REFERENCE TO RELATED APPLICATIONS

This application is a continuation application of U.S. patent application Ser. No. 13/527,101, filed Jun. 19, 2012, which is a continuation of U.S. patent application Ser. No. 11/719,912, filed Jan. 28, 2008 (now U.S. Pat. No. 8,220, 251), which is a U.S. National Phase application of PCT International Application No. PCT/GB2005/050210, filed Nov. 22, 2005, and claims priority of British Patent Application No. 0425708.5, filed Nov. 23, 2004, the disclosures of all of which are incorporated herein by reference in their entireties for all purposes.

FIELD OF THE INVENTION

The present invention relates to an exhaust system for a compression ignition engine, such as a diesel engine, and in particular it relates to an exhaust system comprising an exotherm generating means consisting essentially of a catalyst and means for injecting hydrocarbon into exhaust gas for combustion on the catalyst.

BACKGROUND OF THE INVENTION

Diesel oxidation catalysts (DOC) are designed to promote chemical oxidation of carbon monoxide (CO) and hydrocarbons (HC) and the soluble organic fraction (SOF) portion of particulate matter (PM). Additional benefits include oxidation of several non-regulated, HC-derived emissions, such as aldehydes or Polycyclic Aromatic Hydrocarbons (PAHs), as well as the reduction or elimination of the odour of diesel exhaust. HCs are oxidised to form carbon dioxide ($CO_2$) and water vapour and CO is oxidised to $CO_2$. Generally, a DOC comprises an active platinum group metal (PGM), typically platinum.

A DOC comprising chromia, palladium (Pd) and platinum (Pt) is known from U.S. Pat. No. 4,303,552.

Some of the oxidation reactions which may occur over a DOC can produce undesirable products and, in effect, act counterproductively to the catalyst purpose. Sulfur dioxide ($SO_2$) can be oxidised to sulfur trioxide ($SO_3$) which can combine with water vapour to form gaseous sulfuric acid $H_2SO_4$. Sulfuric acid vapour can combine with further water vapour to generate sulfuric acid particles which are detected as particulates in assessing total PM emissions from an engine. Sulfur can also poison the oxidation activity of the DOC, and it is believed that this is a significant reason why palladium catalysts have not been more widely accepted in the market.

Exhaust gas temperatures for compression ignition engines, particularly diesel engines for light-duty diesel vehicles (as defined by the relevant legislation), are relatively low, e.g. about 300° C. and so one challenge facing catalyst developers is to develop durable catalyst formulations with low-light off temperatures. Although sulfur derived from fuel is to be reduced in the European Union countries (from $1^{st}$ Jan. 2005, the maximum sulfur content in Euro 4 (type approval) diesel fuel will be 50 ppm, down from 350 ppm, and this level will probably be reduced to 10 ppm by 2010), in the USA levels are not due to be reduced from their present level of 350 ppm until 2007.

In order to meet existing and future vehicular emission standards for particulate matter, it has been suggested to fit a particulate filter in the exhaust system of a vehicle powered with a compression ignition engine. Suitable filter substrates can include ceramic wall-flow filters and sintered metal filters. It is also known to catalyse the filter in order to bring the combustion temperature of the particulate matter down so that it is within, or closer to, the exhaust gas temperatures generated during normal driving conditions. However, exhaust gas temperatures for light duty compression ignition engines are generally too low for a catalysed filter to regenerate passively and so it has been suggested actively to regenerate the filter in an exotherm generated by combusting hydrocarbon fuel on the catalysed filter, or a separate catalyst upstream of the filter. Such an arrangement is described, for example, in GB-A-2064983.

U.S. Pat. No. 4,686,827 describes an exhaust system for a diesel engine in which an electrically heated catalyst is used to generate an exotherm from hydrocarbon fuel injected into the exhaust gas for active regeneration of a downstream filter. In one embodiment, the electrically heated catalyst is platinum-palladium.

In our WO 2004/025093 we describe a compression ignition engine operable in a first, normal running mode and a second mode producing exhaust gas comprising an increased level of CO relative to the first mode and means when in use to switch engine operation between the two modes, the engine comprising an exhaust system comprising a supported Pd catalyst associated with at least one base metal promoter and an optionally supported Pt catalyst associated with and/or downstream of the catalyst wherein CO is oxidised by the supported Pd catalyst during second mode operation. According to the disclosure, increased CO can be generated: by injecting HC into the exhaust system over a partial oxidation catalyst; by adjusting the ignition timing of at least one engine cylinder; and/or adjusting the engine air-to-fuel ratio of at least one engine cylinder. In one embodiment, the Pd catalyst and associated base metal and optional Pt catalyst components comprise a diesel oxidation catalyst.

US 2002/0053202 discloses a combined $H_2$ supplying and SOF adsorbing-oxidising catalyst comprising at least one of Pt, Pd and/or rhodium (Rh) and cerium (Ce) for use in combination with a downstream $NO_x$ absorbing catalyst and periodic enrichment of the air/fuel ratio of the exhaust gas. The Examples illustrate a $H_2$ supplying and SOF adsorbing-oxidising catalyst consisting of $Pt/CeO_2$ and $Pt/La.SiO_2$.

SUMMARY OF THE INVENTION

We have now discovered that, very surprisingly, the combination of platinum and palladium is more active for generating an exotherm than either of the equivalent amounts of the Pt or Pd taken alone. That is, there exists a synergy between platinum and palladium for generating an exotherm from hydrocarbon fuel that had not been identified previously. This discovery enables a platinum-palladium catalyst to be used without electric heating, so that the exhaust system is less complex and the fuel penalty from electrically heating the catalyst is saved. Furthermore, we have identified certain embodiments that are more resistant to sulfur poisoning, or can be more readily de-sulfated using the exotherm generated by combustion of hydrocarbon fuel.

According to one aspect, the invention provides an apparatus comprising a compression ignition engine and an exhaust system therefor comprising at least one exhaust system component for treating exhaust gas and means for generating an exotherm for heating the at least one exhaust system component, which exotherm generating means consisting essentially of a catalyst and means for injecting hydrocarbon into exhaust gas for combustion on the catalyst, which catalyst consisting essentially of both a palladium (Pd) component and a platinum (Pt) component, and an optional support material, disposed on a substrate monolith.

The Pt-component and the Pd-component can be organised in any one of a number of arrangements. In a first arrangement, the Pt and Pd components are in a single washcoat layer. In one embodiment of the first arrangement, both the Pd component and the Pt component are supported on the same support material. In a second embodiment, the Pd component is supported on a first support material and the Pt component is supported on a second support material. In a third embodiment, the Pt component is disposed in a zone on an upstream end of the substrate monolith and the Pd component is disposed on a downstream end of the substrate monolith.

In a second arrangement, the Pd component supported on a first support material is in a first washcoat layer and the Pt component supported on a second support material is in a second washcoat layer. In this latter arrangement, the first washcoat layer can be disposed below the second washcoat layer, or vice versa.

It is understood that in arrangements wherein the Pt component and the Pd component are closely associated, such as in the embodiment of the first arrangement wherein the Pd and Pt components are on the same support material, the Pt and Pd components can form an alloy. Generally, this results in an active component that takes on properties of both components. For example, the alloy is less metallic than Pt per se. This can be useful for applications where the catalyst is exposed to high temperature because the alloy is more resistant to sintering than Pt per se. Moreover, Pd is a relatively poor NO oxidation catalyst compared with Pt, so the alloy can promote NO oxidation more effectively than Pd alone. Accordingly, the alloy can retain HC and CO oxidation activity better than the sintered Pt.

In embodiments wherein the Pt component is supported on a first support material and the Pd component is supported on a second support material, the first support material can be different from the second support material.

Alternatively, in another arrangement, at least one of the Pt component and the Pd component is supported by the substrate monolith per se.

BRIEF DESCRIPTION OF THE DRAWINGS

In order that the invention may be more fully understood, the following Examples are provided by way of illustration only and with reference to the accompanying drawings, wherein.

DETAILED DESCRIPTION OF THE INVENTION

Figure 1:
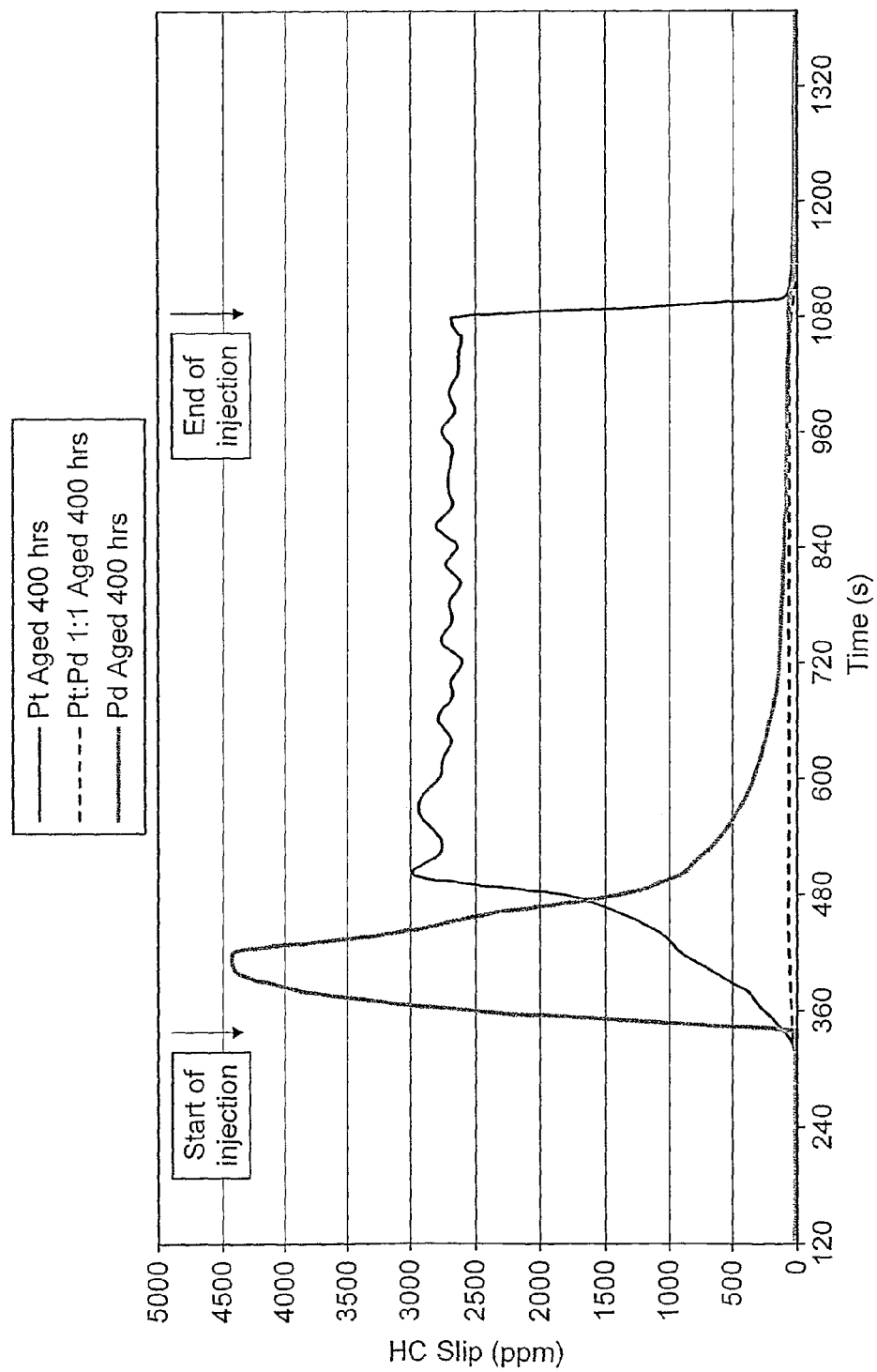
FIG. 1 is a graph showing the HC slip in ppm against time for a Pt only oxidation catalyst, a Pd-only oxidation catalyst and a Pt:Pd 1:1 oxidation catalyst before, during and after HC injection upstream of the catalyst at 7,000 ppm (C3) during steady state conditions with an inlet temperature of 275° C.

Suitable weight ratios for Pt:Pd in the oxidation catalyst can be 6:1 to 1:6, optionally 4:1 to 1:2. Typical total loading of Pt and Pd in the oxidation catalyst can be 10-200 g ft$^{-3}$, optionally 40-100 g ft$^{-3}$.

A problem with Pd-containing oxidation catalysts is that they can become sulfur poisoned relatively rapidly, which can be an issue for countries having higher fuel sulfur. Having researched into ways of reducing or avoiding this problem, we found that one solution is to dispose a Pt catalyst which is substantially free from Pd in a zone on an end of the substrate monolith upstream of the exotherm generating Pt- and Pd-containing catalyst zone. The substantially Pd-free Pt-containing zone can be up to half of the length of the substrate monolith or of a "stripe"-type dimension.

In the embodiment of the first arrangement described above wherein a Pt component zone is disposed on an upstream end of the substrate monolith and a Pd component zone is disposed on a downstream end thereof, the substantially Pd-free Pt-containing zone can comprise the Pt component zone, or alternatively it can be in addition to the Pt component zone. In the latter configuration, the Pt loading in the substantially Pd-free Pt-containing zone can be the same as, or different from, the Pt loading in the Pt component zone.

Generally, the loading of the Pt in the upstream-end catalyst can be 10-200 g ft$^{-3}$, optionally 30-150 g ft$^{-3}$.

In one embodiment, the Pt in the upstream-end catalyst is supported on a support material.

Typically, the or each support material is selected from the group consisting of alumina, silica, ceria, zirconia, titania and mixtures or mixed oxides of any two or more thereof. However, in a particular embodiment, we have discovered that it is advantageous to use a more sulfur tolerant support material for the Pd and Pt components of the exotherm generating catalyst rearward of the front of the substrate monolith and a more thermally durable support material for the Pt and Pd components forward of the back of the substrate monolith. This embodiment is derived from our observation that the temperature in approximately the first third rearward from the front face of the substrate monolith generally remains relatively low as HC is injected into the exhaust gas upstream of the exotherm generating catalyst. Accordingly, it is advantageous to locate a more sulfur tolerant catalyst in this zone because it is more difficult to increase the temperature therein in order to desulfate the associated catalyst.

Contrastingly, temperatures towards the rear of the substrate monolith can reach 1000° C. during HC injection, at which desulfation will occur without significant difficulty. However, thermal durability of catalysts in this location is more of a problem and so the catalyst can be formulated for thermal durability, with advantage.

Suitable support materials for a washcoat for an upstream, sulfur-tolerant catalyst zone can be selected from the group consisting of titania, zirconia, silica and mixtures and mixed oxides of any two or more thereof or mixed oxides or composite oxides containing alumina and at least one of titania, zirconia and silica, whereas alumina is a more appropriate support material to provide increased thermal durability for the catalyst formulation at the downstream end of the substrate monolith.

"Composite oxide" as defined herein means a largely amorphous oxide material comprising oxides of at least two elements which are not true mixed oxides consisting of the at least two elements.

Where the oxidation catalyst comprises a substantially Pd-free Pt-containing zone upstream of the Pd- and Pt-containing exotherm generating catalyst zone, the zone for the sulfur tolerant support material need not correspond with that of the substantially Pd-free Pt-containing zone and the same is the case for the Pd- and Pt-containing zone and the zone of the thermally tolerant support material.

The at least one exhaust system component can comprise an optionally catalysed particulate filter, a $NO_x$ absorber, a selective catalytic reduction (SCR) catalyst or a lean $NO_x$ catalyst. The $NO_x$ absorber, generally an oxide of an alkaline-earth metal, e.g. Ba, Ca or Sr, or an oxide of an alkali metal such as K or Cs, can form part of a $NO_x$-trap, typically comprising a Pt oxidation catalyst and a rhodium reduction catalyst coated on a flow-through monolith substrate. Alternatively, the aforementioned $NO_x$ absorber can be loaded on a particulate filter. Where the filter includes the $NO_x$ absorber, oxidation catalyst and reduction catalyst of the $NO_x$ trap, such an arrangement is often called a 'four-way catalyst' or FWC.

In practice, where the exhaust system comprises a $NO_x$ absorber, suitable control means are incorporated intermittently to reduce the oxygen concentration in the exhaust gas thereby to regenerate the $NO_x$ absorber and reduce the $NO_x$ so-emitted on the $NO_x$ reduction catalyst. Such control means are known to the person skilled in the art and include changing the fuel injection timing to one or more of the engine cylinders or an injector for injecting a suitable reductant, e.g. an HC, directly into the exhaust gas upstream of the $NO_x$ absorber. The fuel injector for generating the exotherm according to the invention can be used for this purpose in embodiments wherein the $NO_x$ absorber and the exotherm generating catalyst is on the same substrate monolith, as discussed below.

In one exemplary embodiment, the substrate monolith is a ceramic or metal flow-through monolith disposed upstream of the at least one exhaust system component. In such an arrangement, the catalyst can be formulated as a DOC for treating CO and HC between exotherm generation events. It will be understood, however, that the catalyst is tuned for low HC light-off activity in order to fulfil its primary function as an exotherm-generating catalyst. In one embodiment, the at least one exhaust system component is a filter, and the exotherm generating means promotes filter regeneration at pre-selected regular intervals or in response to sensor input, e.g. backpressure across the filter.

According to another embodiment, the at least one exhaust system component is a $NO_x$ trap, it being understood that an optimum temperature window exists for $NO_x$ absorption and regeneration of the $NO_x$ absorber and for $NO_x$ reduction. The exotherm generating means can operate to maintain the $NO_x$ trap temperature within a desired temperature window in response to a detected $NO_x$-trap temperature.

In alternative embodiments, the at least one exhaust system component comprises the substrate monolith. Depending on the nature of the at least one exhaust system component, the substrate monolith can be a flow-through monolith or a particulate filter.

In a particular embodiment wherein the substrate monolith is a particulate filter, the exotherm generating catalyst is disposed in a "stripe" or zone configuration on the front end of the substrate monolith and a substantially Pd-free Pt catalyst is coated downstream thereof, wherein the Pt support material can be alumina. This configuration is useful in high temperature applications in that the sintering Pt/alumina can promote NO oxidation more effectively than the sintering exotherm generating catalyst, because of Pt:Pd alloying effects.

The means for injecting HC into the exhaust gas can comprise an injector for injecting the HC into exhaust gas immediately upstream of the exotherm generating catalyst or, alternatively, an injector in one or more cylinders of the engine.

In one embodiment, the compression ignition engine can be a diesel engine, optionally a light-duty diesel engine.

According to a second aspect, the invention provides a method of heating at least one component in an exhaust system of a compression ignition engine, which method comprising generating an exotherm for heating the at least one exhaust system component by contacting a catalyst consisting essentially of both a palladium (Pd) component and a platinum (Pt) component, and an optional support material, disposed on a substrate monolith with an exhaust gas comprising an increased concentration of hydrocarbon relative to the concentration of hydrocarbon present in the exhaust gas during normal operating conditions.

Referring to FIG. 3, 10 refers generally to an exhaust system for a compression ignition engine according to the present invention and 12 represents a pipe for conveying an exhaust gas from the engine to various components of the exhaust system for exhaust gas after-treatment and/or to silence the engine noise before the exhaust gas is passed to atmosphere. The arrows indicate the direction of exhaust gas flow in the system and "upstream" and "downstream" should be interpreted accordingly.

Figure 3A:
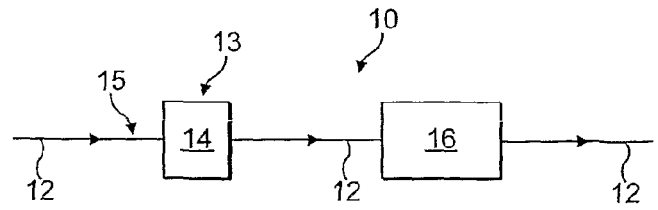
FIGS. 3A, 3B, 3C and 3D show a series of schematic drawings illustrating embodiments according to the present invention featuring a separate exotherm generating catalyst disposed upstream from an exhaust system component.

In FIG. 3A, 13 refers to a flow-through monolith substrate comprising a catalyst coating 14 featuring a single washcoat layer of a particulate support material supporting both a Pt component and a Pd component. Alternatively, catalyst coating 14 can comprise a Pt component and a Pd component, each supported on a separate and optionally different support material from the other in a single washcoat layer. The arrangement of 14 can also comprise the supported Pt component in a first washcoat layer over which is coated a second washcoat layer of the supported Pd component, or the Pd component can be in a layer below the Pt component layer. The feature identified as 15 is an injector for conveying a combustible HC to the exhaust gas upstream of 13, which injector is controlled by a suitably programmed control means, optionally part of the engine control unit (ECU). Feature 16 is the at least one exhaust system component, such as an optionally catalysed particulate filter, a SCR catalyst, a $NO_x$-trap, a four-way catalyst or a lean $NO_x$ catalyst.

Figure 3B:
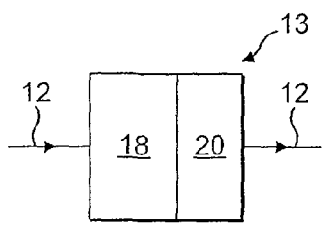
Figure 3C:
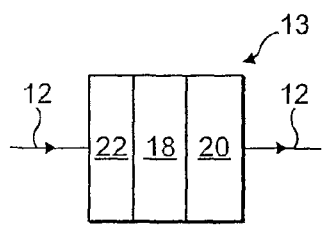
Figure 3D:
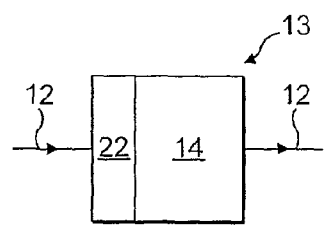

FIGS. 3B, 3C and 3D illustrate alternative embodiments of the flow through monolith substrate 13. In FIG. 3B, 18 represents the Pt component of the exotherm generating catalyst and 20 is the Pd component thereof. FIG. 3C shows an alternative arrangement for use with fuels containing relatively high amounts of sulfur wherein, in addition to the components 18 and 20, a "stripe" of a substantially Pd-free Pt catalyst 22 at higher Pt loading than 18 is located on the upstream end of the flow-through substrate monolith 13. Of course FIG. 3B can represent also a composite embodiment featuring the substantially Pd-free Pt catalyst at substantially the same Pt loading as the Pt component of the exotherm generating catalyst, i.e. the "stripe" of substantially Pd-free Pt catalyst on the upstream side of Pt component 18 is contiguous with Pt component 18 wherein the Pt loading in 22≥18. FIG. 3D illustrates an embodiment wherein the substantially Pd-free Pt catalyst 22 is located on the upstream side of any of the embodiments of 14 discussed above.

Figure 4A:
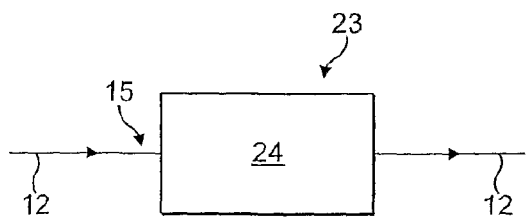
FIGS. 4A and 4B show schematic drawings illustrating embodiments of the invention wherein an exhaust system component comprises an exotherm generating catalyst.
Figure 4B:
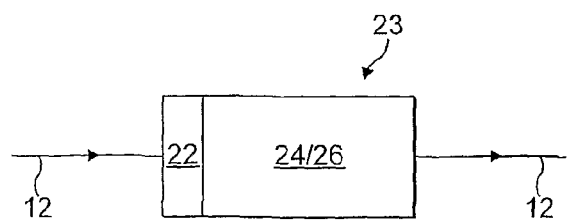

Referring to FIG. 4A, items sharing the same numbering as FIG. 3A-D represent the same feature described hereinabove. Numeral 23 represents a particulate filter substrate monolith and coated with single layer or bi-layer washcoat arrangements 24 similar to those described with reference to feature 14 in FIGS. 3A-D. FIG. 4B illustrates an embodiment of FIG. 4A, wherein a "stripe" of a substantially Pd-free Pt catalyst 22 at higher Pt loading than 24 is located on the upstream end of the filter substrate 23 exotherm generating catalyst 24. Where the filter substrate 23 is coated with a composition comprising the Pt and Pd components of the exotherm generating catalyst, a $NO_x$ absorber such as barium oxide and a rhodium reduction catalyst, the catalyst composition is referred to as a four-way catalyst 26.

EXAMPLES

Example 1

A set of catalyst samples was prepared, each supported on ceramic flow-through substrate monolith with the dimensions: diameter 267 mm (10.5 inch)×length 152 mm (6 inch) and 8.5 litre (519 in$^3$) volume at 62 cells cm$^{-2}$ (400 cells in$^{-2}$) cell density and 0.15 mm (0.06 in) wall thickness. The formulations of the catalyst samples were as follows: (i) Pt only; (ii) Pd only; (iii) 2:1 Pt:Pd; (iv) 1:1 Pt:Pd; and (v) 1:2 Pt:Pd. In each case the Pt and/or Pd was supported on an alumina-based support material and the total PGM loading was equivalent across all of catalyst samples (i) to (v) inclusive. Prior to testing the catalyst samples were aged in air at 700° C. for 200 hours followed by a further 200 hours at 750° C. also in air. For testing, the catalyst samples were located in the exhaust line of a 10 litre, turbocharged engine on a test bed with thermocouples fitted 25 mm in front of the inlet face and 25 mm behind the outlet face. The engine was run at a steady speed and the load was adjusted in order to generate an inlet temperature of 275° C. to the catalyst at an hourly gas space velocity (GHSV) of 45,000 hr$^{-1}$. An independent diesel fuel injector was disposed in the exhaust line upstream of the catalyst, in a position which would ensure an even, well distributed spray of fuel onto the front face of the catalyst sample.

Once stable conditions were obtained, approximately 7,000 ppm hydrocarbon (HC) (C3) was injected continuously into the catalyst for approximately 700 seconds, resulting in a rise in catalyst outlet temperature to approximately 600° C. The quantity of HC at the catalyst outlet, in ppm, was measured throughout the injection period.

FIG. 1 shows the HC slip for catalyst samples (i), (ii) and (iv). It can be seen that the Pd-only catalyst allows a higher level of HC slip when injection commences, compared to the Pt-only catalyst, but this reduces relatively quickly as the catalyst temperature rises. The Pt-only catalyst, although slipping less HC initially, allows more HC through with time and the rate of HC slip becomes constant at a higher level than the Pd-only catalyst. The outlet temperature of the Pt-only catalyst (not shown) was also much lower than either of the Pd-containing catalyst samples tested, possibly because of coking of the catalyst surface. The 1:1 Pt:Pd catalyst exhibited an almost constant, low HC slip throughout the duration of injection and is therefore a considerable improvement on both the single metal containing samples.

Figure 2:
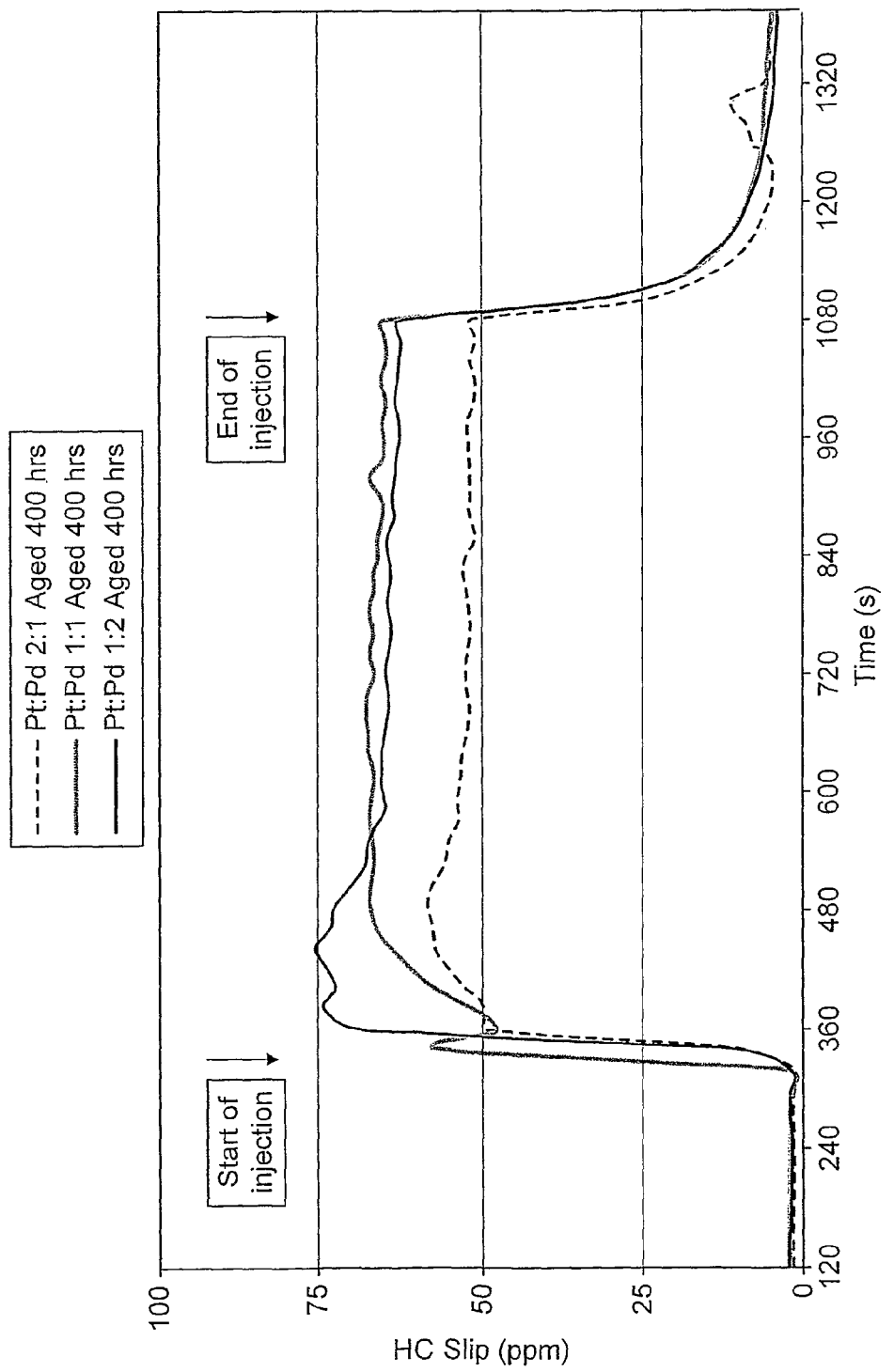
FIG. 2 is a graph showing the HC slip in ppm against time for three oxidation catalysts of differing Pt:Pd before, during and after HC injection upstream of the catalyst at 7,000 ppm (C3) during steady state conditions with an inlet temperature of 275° C.

FIG. 2 shows results of a comparison of the Pt:Pd catalyst samples (ii), (iv) and (v), all of which show similar performance, although the 1:2 Pt:Pd ratio catalyst sample was slightly slower to react when the HC was first injected and takes longer to stabilise, in comparison to the samples which contain at least an equivalent loading of Pt.

Example 2

Experiments were conducted with a different set of catalyst samples coated on flow through monoliths of 152 mm (6 in) diameter×152 mm (6 in) length and 2.8 litres (170 in$^3$) volume at 62 cells cm$^{-2}$ (400 cells in and 0.15 mm (0.06 in) wall thickness. The catalyst formulations consisted of (vi) Pt-only; and (vii) 1:1 Pt:Pd, both on the same alumina supports and at the same total PGM loading. Before testing, the catalysts were aged for 400 hours in a similar manner to Example 1. They were then fitted in the exhaust line of a 6.0 litre, turbocharged engine on a test bed with an independent diesel fuel injector located upstream of the catalyst, as in Example 1. The inlet temperature was measured 25 mm (1 inch) into the front of the catalyst substrate using a thermocouple, and the engine was run at four steady state speeds for 10 minutes in order to generate a temperature of 225° C., 250° C., 275° C. and 300° C., by adjusting engine load. The space velocity range varied from 25-35,000 GHSV as a function of the load. At each temperature condition fuel was injected continuously into the catalyst for 10 minutes at a calculated 7,000 ppm HC (C3) concentration. After fuel injection was completed, the exhaust temperature was held for a further 10 minutes before the next inlet temperature set point was obtained. For each temperature set point the temperature rise and HC slip (ppm) were recorded.

Table 1 summarises the stabilised temperature rise across the catalyst and the approximate percentage removal of HC during the injection period. The data confirm that the Pt:Pd catalyst produces a higher temperature rise at a lower inlet temperature with less HC slip than the Pt system, thus exhibiting excellent fuel combustion properties for the regeneration of particulate filters.

TABLE 1

|  | 100% Platinum | | | | 1:1 Pt:Pd | | | |
| --- | --- | --- | --- | --- | --- | --- | --- | --- |
| Inlet Temperature (° C.) | 225 | 250 | 275 | 300 | 225 | 250 | 275 | 300 |
| Temperature Rise (° C.) | −5 | 100 | 200 | 230 | 45 | 390 | 400 | n.a. |
| HC Removal (%) | 75 | 88 | 92 | 95 | 83 | 95 | >99 | n.a. |

The invention claimed is:

1. A method of heating at least one component in an exhaust system of a diesel engine, which method comprising generating an exotherm for heating the at least one exhaust system component by contacting a catalyst with an exhaust gas comprising an increased concentration of hydrocarbon relative to the concentration of hydrocarbon present in the exhaust gas during normal operating conditions, wherein the catalyst consists essentially of a palladium (Pd) component and a platinum (Pt) component, a support material and a $NO_x$ absorber comprising an oxide of an alkaline-earth metal, disposed on a substrate monolith, wherein the palladium (Pd) component and the platinum (Pt) component are both supported on the same support material.

2. A method according to claim 1, wherein the alkaline earth metal is barium (Ba), calcium (Ca) or strontium (Sr).

3. A method according to claim 1, wherein the weight ratio of Pt:Pd in the catalyst is 5:1 to 1:5.

4. A method according to claim 1, wherein the support material is selected from the group consisting of alumina, silica, ceria, zirconia, titania and mixtures or mixed oxides of any two or more thereof.

5. A method according to claim 1, wherein the increased concentration of hydrocarbon relative to the concentration of hydrocarbon present in the exhaust gas during normal operating conditions is provided when the catalyst has an inlet temperature of 225 to 300° C.

6. A method according to claim 1, wherein the increased concentration of hydrocarbon relative to the concentration of hydrocarbon present in the exhaust gas during normal operating conditions is provided by injecting hydrocarbon (HC) into the exhaust gas upstream of the substrate monolith.

7. A method according to claim 1, wherein the increased concentration of hydrocarbon relative to the concentration of hydrocarbon present in the exhaust gas during normal operating conditions is provided by injecting hydrocarbon (HC) into one or more cylinders of the diesel engine.

8. A method according to claim 1, wherein the substrate monolith is a flow-through monolith disposed upstream of the at least one exhaust system component.

9. An apparatus comprising a diesel engine and an exhaust system therefor comprising at least one exhaust system component for treating exhaust gas and means for generating an exotherm for heating the at least one exhaust system component, which exotherm generating means consists essentially of a catalyst and means for injecting hydrocarbon into exhaust gas for combustion on the catalyst, which catalyst consists essentially of a palladium (Pd) component, a platinum (Pt) component, a support material and a $NO_x$ absorber comprising an oxide of an alkaline-earth metal, disposed on a substrate monolith, wherein the palladium (Pd) component and the platinum (Pt) component are both supported on the same support material.

10. An apparatus according to claim 9, wherein the alkaline earth metal is barium (Ba), calcium (Ca) or strontium (Sr).

11. An apparatus according to claim 9, wherein the support material is selected from the group consisting of alumina, silica, ceria, zirconia, titania and mixtures or mixed oxides of any two or more thereof.

12. An apparatus according to claim 9, wherein the substrate monolith is a flow-through monolith disposed upstream of the at least one exhaust system component.

13. An apparatus according to claim 9, wherein the platinum (Pt) component and the palladium (Pd) component of the exotherm generating means are disposed on a downstream end of the substrate monolith and an upstream end of the substrate monolith comprises a Pt catalyst which is substantially free from Pd.

14. An apparatus according to claim 9, wherein the at least one exhaust system component comprises a particulate filter.

15. An apparatus according to claim 9, wherein the at least one exhaust system component comprises a selective catalytic reduction (SCR) catalyst.

16. An apparatus according to claim 9, wherein the substrate monolith is a particulate filter.

17. An apparatus according to claim 9, wherein the means for injecting hydrocarbon into the exhaust gas comprises either (a) an injector for injecting the hydrocarbon into exhaust gas upstream of the substrate monolith or (b) an injector in one or more cylinders of the engine.

* * * * *